United States Patent [19]

Gross

[11] Patent Number: 5,065,970
[45] Date of Patent: Nov. 19, 1991

[54] BRACKET TO SUPPORT A TISSUE BOX ON A SUN VISOR

[76] Inventor: Shelly Gross, The Fairmont, Apt. 504, Bala Cynwyd, Pa. 19004

[21] Appl. No.: 637,402

[22] Filed: Jan. 4, 1991

[51] Int. Cl.⁵ .................................. F16M 13/00
[52] U.S. Cl. ........................ 248/311.2; 248/311.3; 248/316.7; 248/318; 248/905
[58] Field of Search ............... 248/316.7, 311.2, 311.3, 248/318, 905, 231.8, 444.1

[56] References Cited

U.S. PATENT DOCUMENTS

| | | | |
|---|---|---|---|
| 159,954 | 9/1950 | Catanese . | |
| D. 162,122 | 2/1951 | Broeren | 248/311.2 X |
| 2,263,956 | 11/1941 | Russell | 248/311.2 |
| 2,278,011 | 3/1942 | Murdock . | |
| 2,287,581 | 6/1942 | Walker . | |
| 2,395,592 | 2/1946 | Tierney . | |
| 2,432,674 | 12/1947 | Office . | |
| 2,564,997 | 8/1951 | Rome . | |
| 2,908,434 | 10/1959 | Schnabel . | |
| 3,019,908 | 2/1962 | Theurer . | |
| 3,026,999 | 3/1962 | Constantino . | |
| 3,258,238 | 6/1966 | Grafton | 248/311.3 |
| 3,801,056 | 4/1974 | Brody | 248/311.3 X |
| 3,982,717 | 9/1976 | Pavelle et al. . | |
| 4,335,864 | 6/1982 | Merlini | 248/316.7 |
| 4,696,448 | 9/1987 | Mazloom et al. . | |
| 4,767,094 | 8/1988 | Brown | 248/444.1 |

*Primary Examiner*—David L. Talbott
*Attorney, Agent, or Firm*—Caesar, Rivise, Bernstein, Cohen & Pokotilow, Ltd.

[57] ABSTRACT

A tissue box holder to be frictionally mounted on the sun visor of a vehicle to hold a box having a plurality of tissues therein. The tissue box holder comprises a bracket having a generally U-shaped configuration. The bracket comprises visor engagement means for releasably securing the device to the sun visor by placing the visor engagement means about the rear edge of the sun visor, tissue box engagement means for releasably securing the box of tissues to the sun visor, dispensing means for dispensing the plurality of tissues from the box of tissues and cushioning means for cushioning the bracket. In the preferred embodiment, the visor engagement means has a notched opening to permit the user to use a conventional mirror which is secured to the visor.

5 Claims, 1 Drawing Sheet

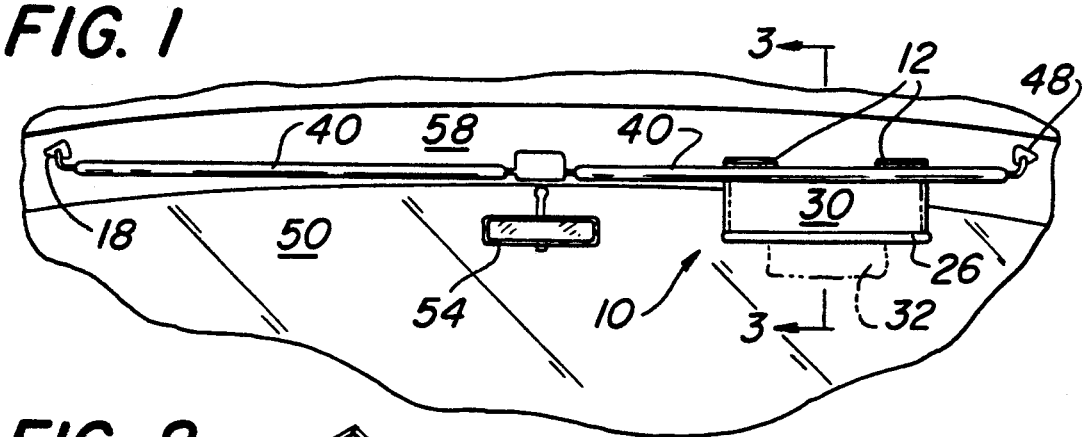
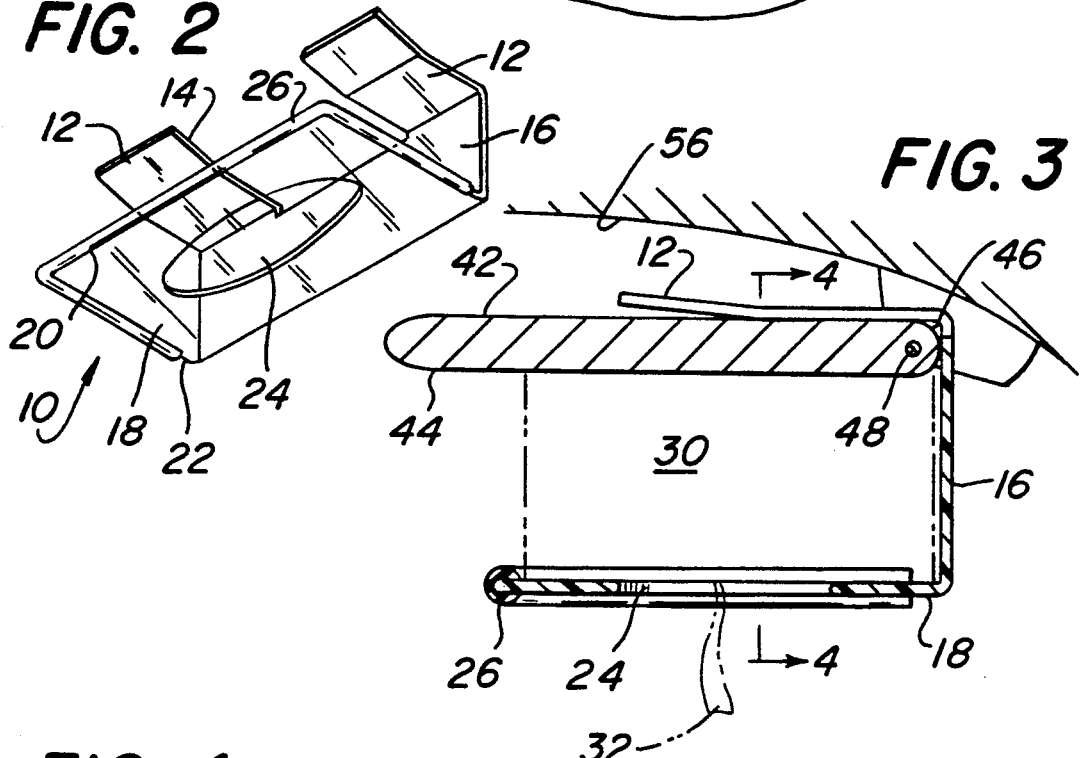
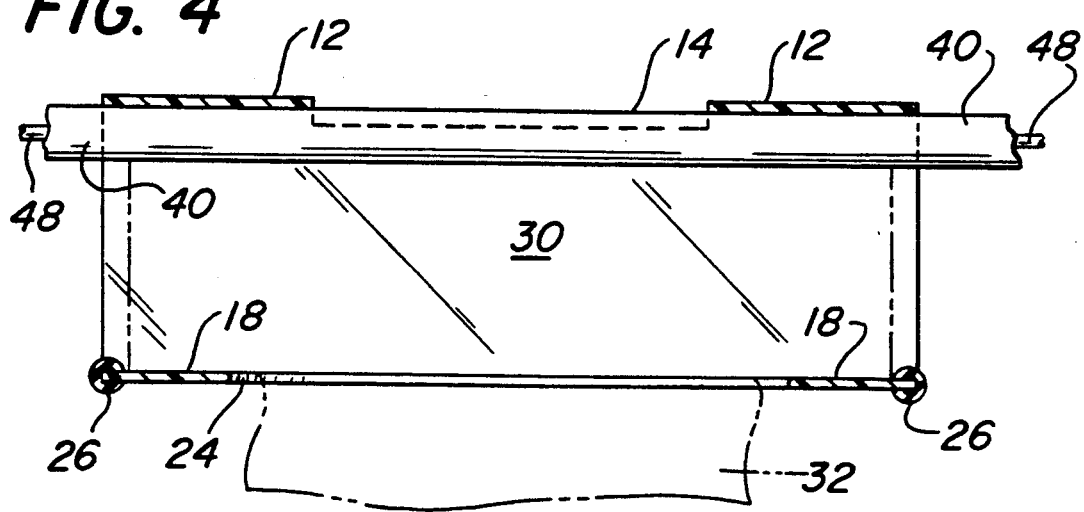

BRACKET TO SUPPORT A TISSUE BOX ON A SUN VISOR

BACKGROUND OF THE INVENTION

In today's day and age, families and individuals are frequently traveling to their destination in their automobile or van, etc. As a result, people are spending longer time periods in their vehicle while commuting to work, during vacations, etc. It has therefore become a common practice to carry among other convenience items in the vehicle, a conventional container of disposable tissues which can be purchased at almost any food or drug store.

Among other uses, these tissues may be used as handkerchiefs, used in the care of infants and small children, used to clean driving glasses and to absorb small spills.

Although it is advantageous to have such a supply of tissues readily available to the car driver or passenger, it is important that the tissues be stored in a manner which does not interfere with safety. One way in which a container of tissues may be stored is via an attachment device which is mountable on the pivotable sun visor of the automobile or van.

The prior art is replete with various types of tissue dispensers which are mountable on a sun visor. In U.S. Design Pat. No. 159,954 (Catanese) is disclosed a receptacle attachment for automobile visors which contains a receptacle which could be used for holding tissues and which attaches to the visor by a pair of clips over the back of the visor.

In U.S. Pat. No. 2,278,011 (Murdock) is disclosed a paper pack holder which is removably attached to a pivotable member or visor, by means of spring holder clips which engage the tissue box and which is provided with hooks which go over the journalled edge portion of the visor.

In U.S. Pat. No. 2,564,997 (Rome) is disclosed a disposable tissue box container and support therefor which contains a front portion having an elliptical opening for removal of tissues which is part of a case that fits over the tissue box and contains on the rear side, a clip which is adapted to hold the front portion of the case against the visor.

Other types of tissue holding devices to be secured to or about the sun visor, include those disclosed in U.S. Pat. Nos. 3,026,999 (Constantino), 4,696,448 (Mazloom et al.), 3,982,717 (Pavelle et al.), 2,908,434 (Schnabel), 2,395,592 (Tierney), and 2,287,581 (Walker).

In addition, other types of devices which may be attached to a sun visor generally include those disclosed in U.S. Pat. Nos. 2,432,674 (Office) and 3,019,908 (Theurer).

While these devices have generally been suitable for their intended purposes they have suffered from numerous drawbacks, including complexity of design and mounting and an overall lack of aesthetically pleasing appearance. In addition, since many of the devices utilize metal springs, clips, etc., to mount the device on the visor, they inherently are unsafe in the event of an accident and are more susceptible to breakdown. Further, the prior art devices are expensive to manufacture due to their multi-component complexity.

Accordingly, a need exists for a bracket to support a tissue box on a sun visor which is inexpensive to manufacture and install, is safe, and yet, aesthetically pleasing.

OBJECTS OF THE INVENTION

Accordingly, it is a general object of this invention to provide a bracket to support a tissue box on a sun visor which overcomes the disadvantages of the prior art.

It is a further object of this invention to provide a bracket to support a tissue box on a sun visor which is inexpensive to manufacture and is easy to mount.

It is yet a further object of this invention to provide a bracket to support a tissue box on a sun visor which is aesthetically pleasing.

It is still a further object of this invention to provide a bracket to support a tissue box on a sun visor which is easily mounted to the visor via friction and yet provides safety to the passengers in the event of a traffic accident.

SUMMARY OF THE INVENTION

These and other objects of this invention are achieved by providing a tissue box holder to be frictionally mounted on the sun visor of a vehicle to hold a box having a plurality of tissues therein. The tissue box holder comprises a bracket having a generally U-shaped configuration. The bracket comprises visor engagement means for releasably securing the device to the sun visor by placing the visor engagement means about the rear edge of the sun visor, tissue box engagement means for releasably securing the box of tissues to the sun visor, dispensing means for dispensing the plurality of tissues from the box of tissues and cushioning means for cushioning the bracket.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is a front elevational, partially broken away view of the interior of the front part of the passenger compartment of a vehicle showing the device of the present invention secured to a sun visor;

FIG. 2 is an isometric view of the device of the present invention;

FIG. 3 is an enlarged cross-sectional view of the device of the present invention installed on a sun visor taken along line 3—3 of FIG. 1; and FIG. 4 is a cross-sectional view of the device of the present invention installed on a sun visor, taken along line 4—4 of FIG. 3.

DETAILED DESCRIPTION OF THE PREFERRED EMBODIMENT

Referring now to various figures of the drawing wherein like reference numerals refer to like parts, there is shown at 10 in FIGS. 1 and 2, a device constructed in accordance with this invention.

As seen in more detail in FIG. 2, the device 10 is basically a U-shaped bracket which comprises a top panel 12 having a notched opening 14 through which a person may view a mirror (not shown) secured to the visor 40, a rear panel 16, a bottom panel 18 having an elliptical opening 24 to dispense tissues 32 from a conventional tissue box 30 (FIG. 1), and a cushion 26 about the front and side edges, 20 and 22 respectively, of the bottom panel 18, all to be described in further detail below.

As shown in FIG. 3, the device 10 may be frictionally mounted over a sun visor 40 in its stored orientation by sliding the top panel 12 of the device 10, i.e., the visor engagement component, over and about the rear edge 46 of the visor, the longitudinal axis of which typically rotates about a pivot bracket 48. The top panel 12 of the device 10 rests on the top surface 42 of the visor 40 and the user may then insert a conventional tissue box 30 filled with a plurality of tissues 32 between the bottom panel 18 and the top panel 12 which is dimensioned to frictionally engage the bottom of the visor and the inner surface of bottom panel 18. The insertion of the box of tissues 30 thus causes the device 10 to be mounted to the visor 40 and the box of tissues 30 to be held snugly by the device 10.

The box of tissues 30 is preferably mounted over the visor 40 on the passenger's side. So mounted, the mounting of the tissue box does not interfere with the driver's vision.

As shown in FIG. 1, the interior of the front of a typical vehicle 50 has a rear view mirror 54 generally in the center of the windshield 52. On either side of the mirror 54 are conventional pivotable sun visors 40 which are secured to the windshield plate 58 near the vehicle roof 56 via pivot bracket 18. The visors 40 may be pivoted from their stored, upright position which is generally flush against the roof 56 or adjacent thereto (FIG. 3), to a lower position which is at an angle downward of the roof 56 (not shown) to shield the sun or reflected light from the driver's and/or passenger's eyes. The device 10 of the present invention is designed to be removably secured over the sun visor 40 to permit the visor to function for its intended purposes without interfering therewith.

As shown in FIG. 2, the device 10 has a top panel 12 which is inserted over the visor 40 (FIG. 3) and upon which the device 10 rests. The top panel 12 acts to engage visor 40 to secure the device 10 in the desired orientation. Preferably, the top panel 12 has a notched opening 14 located in its center to permit the user to view a mirror (not shown) which may be secured to the top surface 42 of the visor 40. The mirror may be used for any purpose, e.g., typically a passenger may check his/her appearance while the driver is driving.

As shown in FIGS. 2 and 3, generally perpendicular and integral to the top panel 12 is rear panel 16 which aids to frictionally hold the tissue box 30 in place during use of the device 10. Perpendicular to rear panel 16, and generally integral therewith is bottom panel 18 which is also used to secure the box of tissues 30 to the visor 40. In addition, the generally rectangular bottom panel 18 has an opening 24 for dispensing the plurality of tissues 32 from a conventional tissue box 30. Although the opening 24 may be of any shape, in the preferred embodiment, the opening 24 is elliptical to conform to the opening 34 of a standard box of tissues 30.

Although the rear panel 16 may be a range of widths, it is preferably dimensioned to make the bracket a suitable height (as measured from the top panel 12 to the bottom panel 18) so that a conventional box of tissues 30 is frictionally secured between the device 10 and the visor 40. When the device 10 is manufactured, the height of rear panel 16 may be adjusted to conform to the variety of sizes of tissue boxes 30 available.

Also, strips of foam having a self-adhesive surface can be used to tighten the fit or permit the device 10 to accept a smaller tissue box. The strips are secured to the inner surface of the panel 18 and are provided between the outer surface of the tissue box and the inner surface of the bottom panel 18.

In addition, as shown in FIGS. 2 and 4, the device 10 additionally comprises a cushion 26 to prevent injury to the passenger in the event of a sudden stop or an accident. To that end, although the cushion 26 may be secured in any manner to the device 10, it is preferable that the cushion be secured about the front edge 20 and side edges 22 of the bottom panel 18 by a conventional adhesive (not shown). Although any suitable cushion may be used, in the preferred embodiment, the cushion 26 comprises conventional foam rubber which may be painted or dyed to a variety of colors to accent or complement the vehicle interior. Also the cushion 26 may be alternatively colored with a luminescent material to aid in locating the device at night.

As shown in FIG. 4, when the tissue box 30 is held in the device 10, the tissues 32 hang downward through the tissue box opening 34 and through the opening 24 of the device 10 so that they are readily accessible for use. In addition, should the individual wish to use the mirror (not shown) secured to the top surface 42 of the visor 40, the individual merely has to pivot the visor 40 in a typical fashion. The device 10 of the present invention is advantageous because it does not interfere with the normal functioning of the visor 40 as a sun or light shield.

In addition, the device 10 of the present invention is advantageous because it is readily removable from the visor 40 when desired. Since the device 10 is frictionally mounted, in the event of an accident, causing the passenger's head to hit the device 10, the device 10 and tissue box 30 slip off the visor 40 so that a passenger (not shown) does not hit his or her head on an immovable device 10. The device 10 thus falls safely to the floor of the vehicle when abutted by a passenger.

The device 10 of the present invention is also extremely advantageous because of the simplicity of its design and ease of manufacture. Although the device 10 may be comprised of any suitable resilient material such as a thermoplastic resin, in the preferred embodiment (FIG. 2), the device 10 is comprised of ⅛" thick clear acrylic and is formed of one piece, permitting the device to be relatively inexpensive. The simplicity of design of the present invention also facilitates its mounting on and/or removal from the visor 40, without any complicated or dangerous springs, clips, etc. or messy adhesives.

Without further elaboration the foregoing will so fully illustrate my invention that others may, by applying current or future knowledge, adopt the same for use under various conditions of service.

I claim:

1. A tissue box holder to be frictionally mounted on the sun visor of a vehicle to hold a tissue box having a plurality of tissues therein, the sun visor having a top and bottom surface, the tissue box holder being formed of a generally rigid material and comprising a bracket having a generally U-shaped configuration, the bracket comprising a top panel, a rear panel generally perpendicular to the top panel, and a bottom panel extending generally parallel to the top panel and integral with and generally perpendicular to the rear panel and having an opening therein for dispensing the plurality of tissues, wherein the bracket is dimensioned so that when the top panel of the bracket is adjacent the top surface of the sun visor, the distance between the bottom surface of the sun visor and the bottom panel permits the frictional insertion of the tissue box therebetween.

2. The device of claim 1 wherein the opening of the bottom panel is generally elliptical in shape.

3. The device of claim 1 wherein the tissue box holder is comprised of a clear, resilient plastic.

4. The device of claim 1 wherein the bottom panel includes a front edge and two side edges and the bracket additionally comprises a cushioning means comprising a generally resilient cushioning member secured to the front edge and two side edges of the bottom panel.

5. The device of claim 4 wherein the resilient cushioning member is comprised of foam rubber.

* * * * *